United States Patent

[11] 3,609,106

| [72] | Inventors | Anthony Joseph Papa<br>St. Albans;<br>William Robert Proops, Charleston, both of W. Va. |
|---|---|---|
| [21] | Appl. No. | 813,751 |
| [22] | Filed | Apr. 4, 1969 |
| [45] | Patented | Sept. 28, 1971 |
| [73] | Assignee | Union Carbide Corporation<br>New York, N.Y. |

[54] ANTIMONY CARBOXYLATES AND ALCOHOLATES AS CATALYSTS IN PRODUCING POLYESTER-POLYURETHANE POLYMERS
6 Claims, No Drawings

[52] U.S. Cl. .................................................. 260/2.5 AB,
260/2.5 AC, 260/75 NB, 260/75 NC, 260/77.5
AB, 260/77.5 AC
[51] Int. Cl. ........................................................ C08g 41/00
[50] Field of Search ........................................... 260/2.5 AB,
2.5 AC, 75 NB, 75 T, 77.5 AB, 77.5 AC, 75 NC,
674, 253

[56] References Cited
UNITED STATES PATENTS

| 3,235,518 | 2/1966 | Hostettler et al. | 260/2.5 |
| 3,242,108 | 3/1966 | McGary et al. | 260/2.5 |
| 3,245,958 | 4/1966 | Hindersinn et al. | 260/75 |
| 3,407,153 | 10/1968 | Bowman et al. | 260/2.5 |
| 3,450,676 | 6/1969 | Grogler et al. | 260/77.5 |

FOREIGN PATENTS

| 1,294,010 | 4/1962 | France | 260/77.5 UX |
| 674,252 | 4/1966 | Belgium | 260/2.5 UX |

Primary Examiner—Donald E. Czaja
Assistant Examiner—H. S. Cockeram
Attorneys—Paul A. Rose, Louis C. Smith and Francis M. Fazio ABSTRACT: The production of polyester-polyurethane products is improved by the use of antimony carboxylates and antimony alcoholates, such as antimony triisopropoxide and antimony octoate, as catalysts. The products have improved thermal properties and can be used in those applications wherein urethane foams are conventionally employed and improved thermal properties are desired.

ANTIMONY CARBOXYLATES AND ALCOHOLATES AS CATALYSTS IN PRODUCING POLYESTER-POLYURETHANE POLYMERS

This invention relates to an improved process for producing thermally stable ester-urethane polymer foams. More particularly it is concerned with the use of certain antimony compounds as catalysts in the production of said foams.

The production of rigid urethane foams is well known. Generally, these foams are produced by the catalytic reaction of an organic polyisocyanate with a polyfunctional polyether or polyester having hydrogen atoms reactive with the isocyanato group. However, the urethane foams generally suffer from the deficiency that they are not thermally stable. Thus, exposure to heat or flame can cause severe degradation of the foam. Attempts have been made to resolve this problem by the addition of flame retardant materials or by the modification of the chemical structure of the reactants used.

Recently a modified ester-urethane foam was disclosed in Belgium Pat. No. 674,253 based on certain precursors which are the reaction products of trimellitic acid derivatives with a polyarylisocyanate. These modified foam compositions are reported to have improved thermal properties, however, the processes for their production are not as rapid as are the processes for the production of conventional urethane foams.

It has now been discovered that the modified ester-upethane foams having the improved thermal properties can be produced rapidly and efficiently by the use of certain catalysts. These catalysts are the antimony carboxylates and the antimony alcoholates as hereinafter defined. It was also found that these novel catalysts can be used in conjunction with the conventional amine and tin catalysts normally used in the production of urethane foams.

The antimony carboxylates that can be used as catalysts can be represented by the general formula:

and the antimony alcoholates that can be used are represented by the general formula:

wherein R represents an alkyl group having from one to about 20 carbon atoms, preferably from about six to about 12 carbon atoms, and R' is an alkyl group having from one to about 10 carbon atoms, preferably from three to about eight carbon atoms. Illustrative, thereof, one can mention antimony acetate, antimony propionate, antimony butyrate, antimony pentoate, antimony hexoate, antimony octoate, antimony decoate, antimony hendecoate, antimony dodecoate, antimonytetradecoate, antimony octodecoate, antimony eicosoate, antimony trimethoxide, antimony triethoxide, antimony tripropoxide, antimony triisopropoxide, antimony tributoxide, antimony triisobutoxide, antimony tripentoxide, antiomny trihexoxide, antimony trioctoxide, antimony tridecoxide, and the like.

The catalyst can be used at a concentration of from about 0.5 to about 20 parts or more per 100 parts by weight of precursor, preferably from about 1 to about 4 parts. When expressed in terms of antimony equivalents, the amount of catalyst can be from about 0.001 to about 0.25 equivalent, preferably from about 0.002 to about 0.1 equivalent. The antimony equivalent is the equivalent weight of the antimony compound divided by the weight of the compound being used. Any catalytic amount sufficient to catalyze the reaction can be used, alone or in admixture with other antimony compounds or other known catalysts.

As previously indicated, the antimony catalyst can be used in conjunction with a conventional amine compound. When this type of mixture is used, the amine catalyst can be present at a concentration of from about 0.1 or less to about 2 parts by weight or more per 100 parts of precursor. Illustrative of suitable amines one can mention diethylenetriamine, triethanolamine, eriethylenediamine, N-(2-hydroxyethyl)ethyleneimine, triethylamine, N-methylmorpholine, N,N-dimethylbenzylamine, N,N-dimethylethanolamine, and the like, and including all those amine catalysts known to be suitable in the production of urethane polymers.

The reaction can also contain a minor amount of an epoxide. This amount can be from about 0.1 to about 10 parts or more, preferably from about 1 to about 5 parts, per 100 parts by weight of the precursor. Illustrative thereof, one can mention isobutylene oxide, vinylcyclohexene dioxide, glycidol, 3,4-epoxycyclohexylmethyl, 3,4-epoxycyclohexanecarboxylate, the diglycidyl ether of bisphenol A, Phenyl glycidyl ether, the diglycidyl ether of butane diol, styrene oxide, propylene oxide, 3,4-epoxy-6-methylcyclohexylmethyl 3,4-epoxy-6-methylcyclohexanecarboxylate, bis(3,4-epoxycyclohexylmethyl)adipate, and the like.

We have hereinbefore referred to the precursors; these are the reaction products of from about 0.2 to about 0.8 mole of a trimellitic acid derivative of the formula:

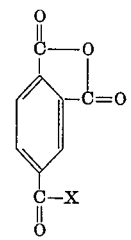

wherein X is hydroxyl or halogen, with one mole of a poly(arylisocyanate) having at least two interconnected aromatic rings having at least one isocyanato group per aromatic ring. It is known that the trimellitic acid anhydride-polyarylisocyanate reaction products can be reacted with a polyol having an average molecular weight of less than about 2,000 and having at least three hydroxyl groups per molecule wherein the molar ratio of the polyol to the trimellitic acid anhydride-polyarylisocyanate reaction product is from about 0.25 to about 0.75 to 1 to produce foams having improved flame resistance properties. This knowledge is available in Belgian Pat. No. 674,253 wherein the procedures for producing the precursors and the products thereof are fully disclosed. The precursors have a viscosity of from about 500 cps. to about 100,000 cps., preferably from about 2,500 cps. to about 10,000 cps., at 25° C.

In preparing the trimellitic acid anhydride-polyarylisocyanate reaction products, herein called "precursors," the preferred derivative used in the reaction with the polyisocyanate is the acyl chloride, i.e., the compound wherein X is chlorine. The trimellitic acid anhydride or its derivative is reacted with a polyarylisocyanate having at least two aromatic rings with one isocyanato group on each ring. These aromatic rings are suitably interconnected by an ether, sulfone, sulfoxide, methylene, propylene, carbonyl linkage or by two methylene groups connected to a benzene ring substituted by an isocyanato group. Polyarylisocyanates which are isocyanate substituted biphenyls are also useful in producing the precursors. In all of these cases the aromatic rings of the polyarylisocyanates can be substituted by methyl, ethyl or propyl groups. Specific examples of suitable polyarylisocyanates for use with the invention include polymethylene polyphenylisocyahate having from three to six benzene rings each substituted by one isocyanato group; 4,4'-diphenylmethylene diisocyanate; 3,3'-diphenylmethylene diisocyanate; diphenyl disocyanate; diphenylsulfone diisocyanate; diphenylsulfide diisocyanate; diphenylsulfone diisocyanate; diphenylsulfide diisocyanate; diphenylsulfoxide diisocyanate; and diphenylpropane diisocyanate. Polymethylene polyphenylisocyanate and 4,4'-diphenylmethylene diisocyanate are preferred isocyanates.

Any polyarylisocyanate disclosed above which is liquid at room temperature or in the temperature of 15° C. to 50° C. will react readily with the trimellitic acid anhydride or its derivatives. The reaction of the trimellitic acid anhydride or its derivatives will proceed at from room temperature up to about 250° C.

In producing the precursors, the ratio of trimellitic acid derivative and the polyarylisocyanate can vary over a wide range. The ratio of the polyarylisocyanate to trimellitic acid derivative is such that from 0.5 to 1.5 isocyanato groups are present for each acid, anhydride, acyl halide or hydroxyl group. The preferred compounds are those obtained by reacting from 0.5 to 1.5 moles of the trimellitic acid derivative per mole of polyarylisocyanate. It should be noted that it is not necessary that all of the acid goes into solution and therefore an excess of the polyarylisocyanate can be tolerated. In the preferred process, 2 parts by weight of trimellitic anhydride derivatives are reacted with 5 parts of polymethylene polyphenylisocyanate having an average of three phenyl rings, each substituted by one isocyanato group.

Illustrative of suitable trimellitic acid anhydride derivative one can mention trimellitic anhydride, trimellitic anhydride acid chloride, pyromellitic dianhydride, and the like.

The precursors most useful for reaction with a polyol are those produced by the reaction of trimellitic anhydride acid chloride with polymethylene polyphenylisocyanate at a temperature of from about 20° C. to about 250° C. or more, preferably from about 125° C. to about 200° C. wherein, an excess of the acid chloride has been used. The precursor product is a liquid. Generally sufficient polyarylisocyanate is reacted with the trimellitic acid anhydride derivative to react with essentially all of the anhydride and carboxyl groups in the precursor and all of the hydroxyl groups in the polyol molecule with which the precursor is subsequently reacted in order to produce the polyester-polyurethane-type polymer.

The precursor is preferably reacted with a polyol having at least three hydroxyl groups and a molecular weight up to about 5,000 or more to produce the polyester-polyurethane polymer. The preferred polyols are those having a molecular weight of from about 250 to about 2,000.

Among the polyols that can be reacted with the precursor by the process of this invention are the known polyether polyols such as the polyoxyalkylene glycols wherein the alkylene group has from two to about four carbon atoms, e.g. poly(oxyethylene)glycol, poly(oxpropylene)glycol, polytetrahydrofurane, poly(oxyethyleneoxypropylene)glycol, polyoxyethyleneoxypropylen) glycol, either heteric, block, or capped; the known vicinal epoxide adducts of organic starters such as the hydroxyl compounds and amines, e.g. glycerine, alpha-methyl glucoside, sucrose, pentaerythritol, trimethylolpropane, 1,2,6-hexanetriol, ethylene diamine, ethanolamine, sorbitol, 1,2,4-butanetriol, diethylenetriamine, diethanolamine, and the like. The literature is replete with such polyols wherein ethylene oxide and/or propylene oxide are the vicinal epoxides used as well as other less common epoxides, and they are well known to those skilled in the art of urethane polymer chemistry. Also useful are the polyesters of polybasic acid with a polyhydroxylic compound. Illustrative of suitable polyester polyols are the reaction products of succinic acid, tetrahydrophthalic acid, fumaric acid, and the like, with ethylene glycol, propylene glycol, diethylene glycol, triethylene glycol, sorbitol, butylene glycol, pentaerythritol, and the like. These polyesters are also known to those skilled in the art. Further, the lactone polyesters obtained by the reaction of caprolactone alone or modified with a polyoxyalkylene chain can also be used. For the purposes of this invention, the term polyol includes those reactive polyesters containing a hydrogen atom reactive with the isocyanato group.

The ester-urethane polymers of the instant invention closely resemble the urethane polymers but are not identical thereto. The urethane polymers contain urethane linkages formed during the reaction of the isocyanato group with the hydroxyl group. In this process the urethane group is also formed by the same mechanism. However, there is an equally important chemical reaction taking place between the free carboxyl groups in the precursor with the hydroxyl group in the polyol to form an ester group. This reaction is not found in the conventional urethane polymer processes. The final product is an ester-urethane polymer, that is, a polymer that contains both ester and urethane groups formed during the catalytic reaction between the precursor and the polyol and also contains imide and amide groups obtained when the precursor was produced.

In the novel catalytic process of this invention the precursor and the polyol are reacted in contact with the specified antimony catalyst and blowing agent to produce a foam having improved thermal properties. The blowing agents are known in the foam art and preferred compounds are the fluorinated alkanes such as fluorotrichloromethane, dibromotetrafluoroethane, trichlorotrifluoroethane, and the like. Also suitable are methylene chloride and the low boiling alkanes such as ethane, propane, and the like; although any of the known blowing agents used in the production of urethane foam can be used.

In carrying out the reaction to produce the polyester-polyurethane foam, the precursor, polyol, catalyst and blowing agent, as well as any other desired additives (surfactants, fillers, colorants, stabilizers, inhibitors, etc.) are mixed together in the selected amounts and permitted to react. The reaction is rapid and generally does not require external heating. The methods known for producing urethane polymers can be employed in this invention.

The concentration of the polyol in the reaction mixture can vary from about 10 to about 75 parts per hundred parts of precursor, preferably from about 20 to about 50 parts. The preferred amount of polyol to be used is an amount that will supply sufficient reactive hydrogen atoms (in the form of hydroxylic or carboxylic hydrogen) to react with the unreacted isocyanato groups of the precursor.

The foams can be stabilized during production by the incorporation into the reaction mixture, in conventional amounts, of any of the known surfactant stabilizers, including the poly(siloxane-oxyalkylene) block copolymers described and claimed in U. S. Pat. No. 2,834,748. Their use is shown in the production of foams in U. S. Pat. No. 3,194,773. The pertinent disclosures thereof are incorporated herein by reference.

In a typical procedure for the production of the eter-urethane polymer foams by the process of this invention all of the ingredients, except the precursor, are mixed together at about room temperature. Then the precursor is added to the mixture all at once and it is stirred vigorously for about 15 seconds, poured into a mold and the mixture is permitted to react and foam. Indication of the rate of reaction is determined by measurement of the cream time, rise time, and tack-free time. After foam formation has been completed, the product can be cured by conventional means.

The following examples serve to further illustrate the process of this invention. The "precursors" used in the following examples are the reaction products of from about 0.2 to about 0.8 mole of a trimellitic acid derivative of the formula

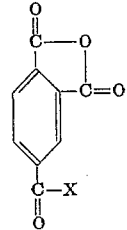

wherein X is hydroxyl or halogen, with one mole of a poly(arylisocyanate) having at least two interconnected aromatic rings having at least one isocyanto group per aromatic ring.

EXAMPLE 1

A recipe was prepared containing the following components:

| | |
|---|---|
| Polyol* | 29 parts |
| Surfactant** | 1 part |
| Fluorotrichloromethane | 11 parts |
| Precursor*** | 100 parts |
| Antimony triisopropoxide | 2.5 parts |

*The adduct of sucrose and propylene/oxide having a hydroxyl number of about 450
**A siloxane oxyethylene block polymer of the formula: $(CH_3)_3$ $SiO[(CH_3)_2SiO]_{15}]HO(C_4H_4O)_7C_3H_6SiCH_2O]_{8.5}Si(CH_3)_3$
***The commercially available reaction product of trimellitic anhydride and polymethylene polyphenyleneisocyanate. A solution of 88.1 parts of said precursor in 11.9 parts of fluorotrichloromethane had a viscosity of 5,950 c.p.s. at 25° C.

The polyol, surfactant, blowing agent and catalyst were mixed at room temperature until homogeneous. The precursor was added all at once with rapid stirring and stirred continuously for 15 seconds. The mixture was poured into a preheated metal mold as soon as it started to foam and the foaming reaction was permitted to take place. The ester-urethane polymer foam was cured for 15 minutes at 70° C; it was a firm rigid foam. The cream time was 10 seconds, the rise time was 100 seconds and the tack-free time was 70 seconds.

EXAMPLE 2

Following the procedure described in example 1 and using the same components, an ester-urethane polymer foam was produced using antimony octoate as the catalyst. The properties of the rigid foam were similar to those of the foam produced in example 1. The cream time was 15 seconds, the rise time 220 seconds and the tack-free time was 140 seconds.

EXAMPLE 3

A rigid foam was produced following the procedure of example 1 and using the same components described therein with the exception that the catalyst was 1.25 parts of antimony triisopropoxide and 1.25 parts of N-(2-hydroxyethyl)ethyleneimine. This foam had similar properties to the foam of example 1. The cream time was less than 10 seconds, the rise time was 140 seconds and the tack-free time was 65 seconds.

EXAMPLE 4

A rigid foam was produced following the procedure of example 1 and using the same components except that the catalyst was a mixture of 2.5 parts of antimony triisopropoxide and 1.45 parts of 3,4-epoxycyclohexymethyl-3,4-epoxy-cyclohexanecarboxylate. The ester-urethane polymer foam had properties similar to the foam produced in example 1. The cream time was 15 seconds, the rise time was 140 seconds and the tack-free time was 105 seconds.

EXAMPLE 5

A rigid foam was produced following the procedure of example 4 using the same components except that the epoxide was the diglycidyl ether of bisphenol A. The ester-urethane foam had similar properties. The cream time was 15 seconds, the rise time was 150 seconds and the tack-free time was 110 seconds.

For comparison purposes a foam was produced using the same components used in examples 1 through 5 inclusive with the exception that there was no catalyst or epoxide present. In this instance a very soft foam was obtained, even after curing at 70° C. for 30 minutes. The reaction was very slow with a cream time of 70 seconds, a rise time in excess of 500 seconds and the tack-free time was 360 seconds. The properties of this foam were not commercially attractive.

A series of experiments was carried out using the procedure described in example 1. The formulation comprised 263 grams of a commercially available 88 percent solution of the reaction product of trimellitic acid anhydride and polymethylene polyphenyleneisocyanate in fluorotrichloromethane, 75 grams of the adduct of propylene oxide and sucrose having an hydroxyl number of 450, 3 grams of the same surfactant used in example 1 and 30 grams of fluorotrichloromethane. The catalysts and the amounts thereof are indicated in table I. This table also sets forth the properties of the rigid foams that were produced.

TABLE I

| Example | 6 | 7 | 8 | Control |
|---|---|---|---|---|
| Catalyst | A | B | C | |
| Grams | 6.60 | 5.83 | 22.3 | 0 |
| Antimony Equivalent | 0.022 | 0.011 | 0.022 | |
| Foaming properties, sec.: | | | | |
| Cream time | 15 | 10 | 15 | 50 |
| Rise time | 160 | 180 | 150 | 520 |
| Tack-free time | 95 | 120 | 110 | 300 |
| Foam rating [1] | 2 | 2 | 2 | 1 |
| Foam properties: | | | | |
| Compressive strength, p.s.i. at 25° C.: | | | | |
| Parallel | 28 | 30 | 22 | 23 |
| Perpendicular | 11 | 13 | 9 | 12 |
| Humid aging, percent change: | | | | |
| Weight: | | | | |
| 7 days | −3.1 | −6.2 | −7.7 | 0.0 |
| 14 days | −3.1 | −3.8 | 5.5 | −4.2 |
| 28 days | 15.2 | 0.5 | 13.6 | 23.4 |
| Volume: | | | | |
| 7 days | 16.3 | 13.5 | 14.1 | 7.7 |
| 14 days | 16.3 | 13.5 | 15.2 | 7.7 |
| 28 days | 16.3 | 11.9 | 14.1 | 7.2 |
| Flammability, ASTM D-1692: | | | | |
| Density, p.c.f. | 2.04 | 1.94 | 2.20 | 2.03 |
| Exting. time, sec. | 42 | 31 | 35 | 60 |
| Burning extent, inches | 0.9 | 1.5 | 1.2 | 0.3 |
| Burning rate, inches/min | 1.4 | 2.9 | 2.0 | 0.3 |
| Friability, ASTM C-367 and C-421: | | | | |
| Density, p.c.f. | 1.92 | 1.81 | 2.13 | 1.72 |
| Wt. loss, percent 2 min | 6 | 7 | 7 | 24 |
| wt. loss, percent 10 min | 58 | 57 | 61 | 95 |
| Isothermal stability at 200° C.: | | | | |
| Density, p.s.f. | 1.99 | 1.85 | 2.19 | 1.99 |
| Volume change, percent: | | | | |
| 1 day | −12.5 | −22.2 | −23.1 | −12.1 |
| 14 days | −50.2 | −48.2 | −63.3 | −36.9 |
| 28 days | −55.4 | −53.5 | −70.2 | −38.3 |
| Weight change, percent: | | | | |
| 1 day | −22.9 | −24.4 | −27.3 | −20.2 |
| 14 days | −35.4 | −36.7 | −39.9 | −34.4 |
| 28 days | −39.7 | −39.5 | −42.1 | −36.9 |

[1] Based on a 0-3 scale: 0—gel-like, 1—soft, 2—firm, 3—very firm.

NOTE.—A=Antimony triisopropoxide; B=Antimony octoate; C=Antimony tallate.

A series of experiments was conducted in which the concentration and type of the antimony catalyst were varied. The formulation in each instance comprised 263 grams of the commercially available reaction product of trimellitic acid anhydride and polymethylene polyphenyleneisocyanate and the same polyol, surfactant and blowing agent in the concentrations that were used in examples 6 to 8. Satisfactory rigid ester-urethane foams were produced with the catalysts of this invention. The results are set forth in table II. The long rise time required by the controls is to be noted.

TABLE II

| Example | Catalyst | Grams | CT | RT | TFT | Foam rating |
|---|---|---|---|---|---|---|
| 9 | Antimony triisopropoxide | 0.897 | 30 | 350 | 165 | 2 |
| 10 | do | 1.50 | 25 | 325 | 155 | 2 |
| 11 | do | 2.99 | 20 | 230 | 105 | 2 |
| 12 | do | 0.60 | 10 | 100 | 80 | 2 |
| 13 | do | 8.97 | 10 | 140 | 80 | 2+ |
| Control | None | | 40 | 520 | 275 | 1 |
| 14 | Antimony octoate | 0.55 | 30 | 410 | 180 | 2 |
| 15 | do | 1.65 | 20 | 330 | 140 | 2 |
| 16 | do | 2.75 | 20 | 280 | 130 | 2 |
| 17 | do | 5.51 | 10 | 190 | 80 | 2 |
| 18 | do | 12.10 | 5 | 95 | 65 | 2 |
| Control | None | | 40 | 520 | 275 | 1 |
| 19 | Antimony tallate | 22.3 | 10 | 140 | 90 | 2+ |
| 20 | do | 11.15 | 25 | 290 | 135 | 2+ |
| 21 | do | 5.60 | 25 | 360 | 160 | 2+ |
| Control | None | | 40 | 500 | 280 | 1 |

Rigid foams were produced using the same components and the same amounts of precursor, polyol, surfactant and blowing agent that were used in examples 6 to 8. The polyol was the propylene oxide adduct of sucrose to a hydroxyl number of about 528. The results are set forth in table III.

A series of experiments was carried out using a mixture of an antimony 1,3 and an amine catalyst. In this series the formulation comprised 263 grams of the commercial reaction product of trimellitic acid anhydride with a polymethylene polyphenylene isocyanate, 75 grams of the polyol used in ex-

TABLE III

| | Example | | | |
|---|---|---|---|---|
| | 22 | 23 | 24 | Control |
| | Catalyst | | | |
| | Antimony triisopropoxide | Antimony octoate | Antimony tallate | None |
| Grams | 6.6 | 5.8 | 22.30 | |
| Foaming properties, sec.: | | | | |
| Cream time | 10 | 10 | 10 | 50 |
| Rise time | 150 | 195 | 160 | 510 |
| Tack-free time | 90 | 120 | 95 | 295 |
| Foam rating | 2+ | 2+ | 2+ | 2 |
| Foam properties: | | | | |
| Cell structure: | | | | |
| Core density, p.c.f | 1.91 | 1.75 | 2.02 | 1.73 |
| Closed cells, percent | 85.6 | 79.9 | 87.5 | 27.0 |
| Compressive strength, p.s.i. at 25° C.: | | | | |
| Parallel | 26 | 23 | 16 | 22 |
| Perpendicular | 9 | 9 | 7 | 10 |
| Humid aging, percent change: | | | | |
| Weight: | | | | |
| 7 days | −5.3 | −2.4 | −11.5 | −0.5 |
| 14 days | −4.6 | −1.9 | −11.5 | 0.8 |
| 28 days | −2.9 | −0.8 | −11.3 | 1.6 |
| Volume: | | | | |
| 7 days | 4.0 | 1.5 | 5.0 | 1.5 |
| 14 days | 4.0 | 1.5 | 5.0 | 1.0 |
| 28 days | 3.0 | 1.0 | 6.0 | 1.5 |
| Flammability, ASTM D-1692: | | | | |
| Density, p.c.f | 1.92 | 1.80 | 2.03 | 1.75 |
| Exting., time, sec | 36 | 39 | 50 | 60 |
| Burning extent, inches | 0.9 | 0.8 | 1.0 | 0.5 |
| Burning rate, inches/min | 1.8 | 1.3 | 1.3 | 0.5 |
| Friability, ASTM C-367 and C-421: | | | | |
| Density, p.c.f | 1.70 | 1.67 | 1.92 | 1.71 |
| Wt. loss, percent: | | | | |
| 2 min | 16 | 20 | 15 | 36 |
| 10 min | 84 | 93 | 88 | 100 |

A series of experiments was carried out to produce a rigid ester-urethane foam using as the catalyst a mixture of the antimony catalyst indicated in table IV and N-(2-hydroxyethyl)ethyleneimine. The formulation used was the same as that in examples 19-21 with the exception that the catalysts are those set forth in the table.

TABLE IV

| Example | 25 | 26 | 27 |
|---|---|---|---|
| N-(2-hydroxyethyl)-ethyleneimine, g | 0.87 | 0.87 | 0.87 |
| Antimony triisopropoxide, g | | 6.60 | |
| Antimony tallate, g | 22.3 | | |
| Antimony octoate, g | | | 5.80 |
| Foaming properties, sec.: | | | |
| Cream time | 10 | 10 | 10 |
| Rise time | 120 | 105 | 160 |
| Tack-free time | 75 | 75 | 110 |
| Foam rating | 2+ | 2+ | 2 | amples 6 to 8 and the same amounts of surfactant and blowing agent used in examples 6 to 8. The foam properties and foaming properties of the rigid ester-urethane foams produced are set forth in the table V. In the table the specific amine and the amount thereof used in conjunction with the antimony catalyst are set forth at the top of each group of examples. Thus, examples 28 to 30 all contained 0.72 grams of tetramethylbutane-1,3-diamine plus the indicated antimony compound.

A series of experiments was carried out to produce a rigid ester-urethane foam using an epoxide in the formulation. The formulation used was the same as that in examples 28 to 35 with the exception that the catalyst was 6.6 grams of antimony triisopropoxide and the recipe also contained the indicated amount of epoxide compound. The results are tabulated in table VI.

TABLE V

| Example | Catalyst | Grams | CT | RT | TFT | Foam rating |
|---|---|---|---|---|---|---|
| | Tetramethylbutane-1,3-diamine | 0.72 | | | | |
| 28 | Antimony triisopropoxide | 6.60 | 10 | 190 | 120 | 2 |
| 29 | Antimony tallate | 23.30 | 10 | 140 | 80 | 2+ |
| 30 | Antimony octoate | 5.80 | 10 | 170 | 115 | 2 |
| | bis(2-dimethylamino)ethyl ether | 0.80 | | | | |
| 31 | Antimony triisopropoxide | 6.60 | 10 | 210 | 110 | 2 |
| 32 | Antimony tallate | 22.30 | 10 | 135 | 75 | 2+ |
| | 1,4-diazabicyclo[2.2.1]octane | 0.56 | | | | |
| 33 | Antimony triisopropoxide | 6.60 | 10 | 140 | 80 | 2 |
| 34 | Antimony tallate | 22.30 | 10 | 130 | 95 | 2+ |
| 35 | Antimony octoate | 5.80 | 10 | 195 | 135 | 2 |

Table V—Continued

| Example | 28 | 29 | 30 | 31 | 32 | 33 | 34 | 35 |
|---|---|---|---|---|---|---|---|---|
| Foam properties: | | | | | | | | |
| Compressive strength, p.s.i. at 25° C.: | | | | | | | | |
| Parallel | 25 | 24 | 30 | 26 | 23 | 25 | 18 | 25 |
| Perpendicular | 10 | 11 | 12 | 10 | 10 | 11 | 9 | 10 |
| Humid aging, percent change: | | | | | | | | |
| Weight: | | | | | | | | |
| 7 days | 11.4 | −7.4 | −3.7 | −2.4 | −11.3 | −4.2 | −10.5 | −5.3 |
| 14 days | 26.1 | 7.2 | 9.6 | 12.2 | −0.6 | 2.2 | −2.3 | 0.5 |
| 28 days | 42.6 | 16.4 | 19.2 | 37.4 | 10.3 | 18.2 | 15.3 | 25.1 |
| Volume: | | | | | | | | |
| 7 days | 6.1 | 10.3 | 5.1 | 6.1 | 10.8 | 5.1 | 8.2 | 4.6 |
| 14 days | 5.1 | 10.3 | 5.1 | 5.6 | 9.8 | 4.6 | 7.7 | 3.5 |
| 28 days | 4.1 | 9.8 | 4.0 | 5.1 | 9.8 | 4.6 | 7.2 | 3.0 |
| Flammability, ASTM D-1692: | | | | | | | | |
| Density, p.c.f. | 1.85 | 2.25 | 1.97 | 1.91 | 2.29 | 1.86 | 2.12 | 1.73 |
| Exting., time, sec. | 47 | 60 | 41 | 60 | 60 | 39 | 43 | 35 |
| Burning extent, inches | 1.0 | 0.9 | 1.3 | 1.0 | 0.8 | 1.3 | 1.2 | 1.8 |
| Burning rate, inches/min. | 1.4 | 0.9 | 2.0 | 1.0 | 0.8 | 2.2 | 1.7 | 3.0 |
| Friability, ASTM C-367 and C-421: | | | | | | | | |
| Density, p.c.f. | 1.70 | 2.16 | 1.75 | 1.75 | 2.15 | 1.68 | 2.00 | 1.59 |
| Wt. loss, percent: | | | | | | | | |
| 2 min | 14 | 11 | 9 | 16 | 12 | 9 | 8 | 2 |
| 10 min | 89 | 66 | 73 | 84 | 70 | 71 | 68 | 70 |

TABLE VI

| | Example | | | |
|---|---|---|---|---|
| | 36 | 37 | 38 | 39 |
| | Epoxide, g. | | | |
| | A | | B | |
| | 0.75 | 39.5 | 1.72 | 66 |
| Foaming properties, sec.: | | | | |
| Cream time | 15 | 10 | 10 | 12 |
| Rise time | 150 | 190 | 150 | 235 |
| Tack-free time | 110 | 135 | 95 | 200 |
| Foam rating | 2 | 2+ | 2+ | 2+ |
| Foam properties: | | | | |
| Compressive strength, p.s.i. at 25° C.: | | | | |
| Parallel | 29 | 36 | 31 | 39 |
| Perpendicular | 11 | 12 | 13 | 16 |
| Humid aging, percent change: | | | | |
| Weight: | | | | |
| 7 days | −5.6 | −2.2 | −3.5 | −0.2 |
| 14 days | −3.5 | 1.5 | 14.5 | 2.7 |
| 28 days | 10.9 | 5.1 | 26.6 | 12.6 |
| Volume: | | | | |
| 7 days | 9.8 | 31.7 | 14.1 | 25.3 |
| 14 days | 10.3 | 33.5 | 12.5 | 25.8 |
| 28 days | 8.2 | 29.5 | 12.5 | 25.3 |
| Flammability, ASTM D-1692: | | | | |
| Density, p.c.f. | 1.89 | 1.86 | 1.99 | 2.03 |
| Exting. time, sec. | 36 | 46 | 38 | 54 |
| Burning extent, inches | 1.2 | 0.5 | 1.0 | 0.5 |
| Burning rate, inches/min. | 2.2 | 0.7 | 1.8 | 0.5 |
| Friability, ASTM C-367 and C-421: | | | | |
| Density, p.c.f. | 1.75 | 1.65 | 1.73 | 1.90 |
| Wt. loss, percent: | | | | |
| 2 min | 2 | 5 | 5 | 7 |
| 10 min | 23 | 48 | 59 | 48 |
| Isothermal stability at 200° C.: | | | | |
| Density, p.c.f. | 1.88 | 1.88 | 1.93 | |
| Volume change, percent: | | | | |
| 1 day | −21.8 | 8.9 | −25.2 | |
| 14 days | −50.5 | −22.2 | −37.6 | |
| 28 days | −58.8 | −22.9 | −39.8 | |
| Weight change, percent: | | | | |
| 1 day | −24.6 | −16.6 | −19.4 | |
| 14 days | −36.7 | −33.9 | −32.7 | |
| 28 days | −40.2 | −36.6 | −34.2 | |

NOTE.—A=3,4-epoxycyclohexylmethyl 3,4-epoxycyclohexanecarboxylate; B=diglycidyl ether of bisphenol A.

What is claimed is:

1. In a process for producing a thermally stable ester-urethane polymer by the reaction of a precursor with a polyol having at least two hydroxyl groups and a molecular weight up to about 5,000, said precursor being the product of from about 0.2 to about 0.8 mole of a trimellitic acid derivative of the formula:

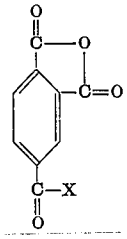

wherein X is hydroxyl or halogen with one mole of a poly(arylisocyanate) having at least two interconnected aromatic rings having at least one isocyanato group per aromatic ring, the improvement of using as catalyst a catalytic amount of an antimony carboxylate of the formula $Sb(OOCR)_3$ or an antimony alcoholate of the formula $Sb(OR')_3$, wherein R is an alkyl group having from one to about 20 carbon atoms and R' is an alkyl group having from one to about 10 carbon atoms.

2. A process as claimed in claim 1 wherein the catalyst is antimony triisopropoxide.

3. A process as claimed in claim 1 wherein the catalyst is antimony octoate.

4. A process as claimed in claim 1 wherein the catalyst is antimony tallate.

5. A process as claimed in claim 1 wherein a member selected from the group consisting of tertiary amine catalysts and tin catalysts is also present.

6. A process as claimed in claim 1 wherein a blowing agent is present.